R. GALGUERA Y GONZALEZ.
FILTERING APPARATUS.
APPLICATION FILED APR. 12, 1918.
1,292,758.
Patented Jan. 28, 1919.
2 SHEETS—SHEET 1.
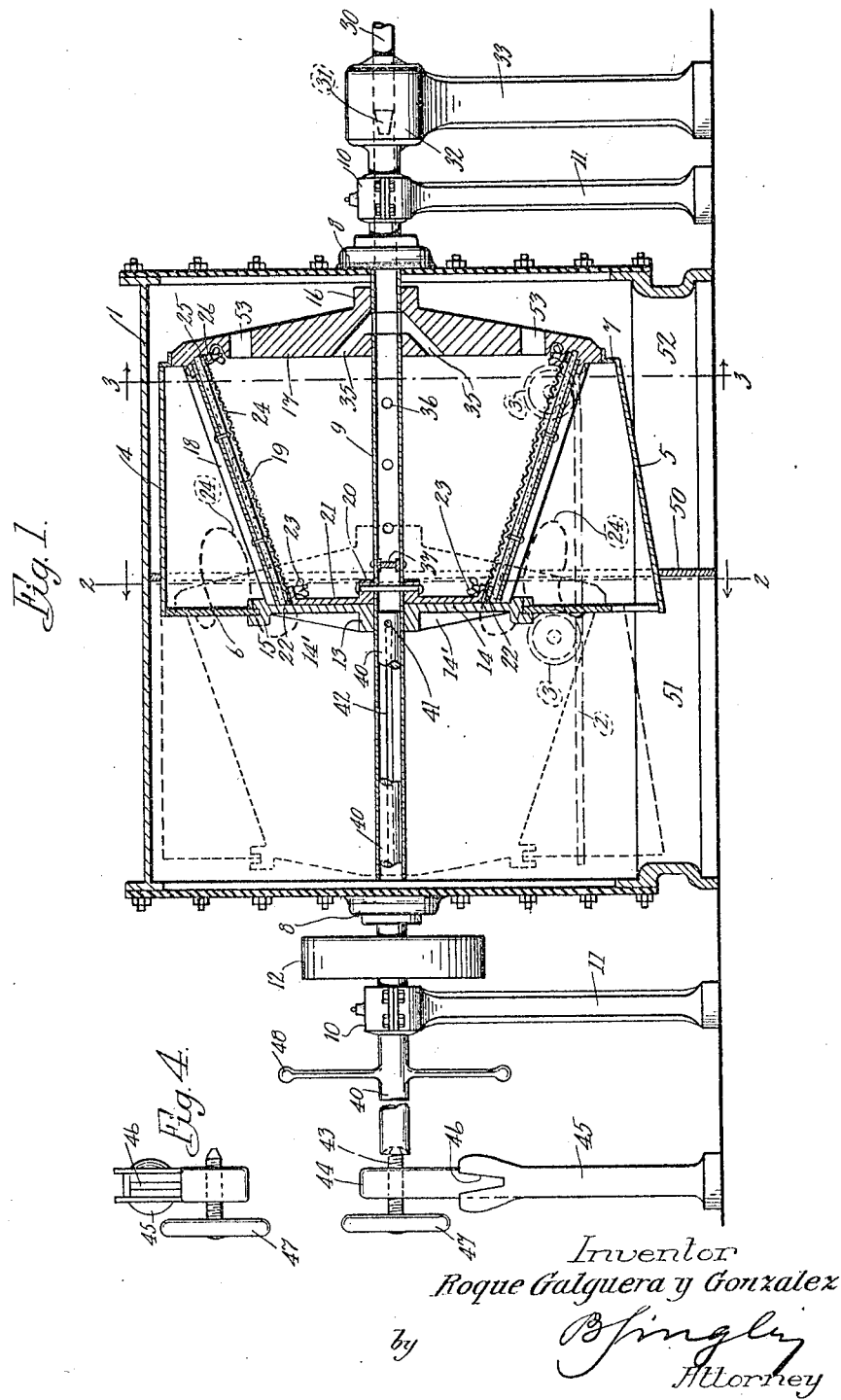
Inventor
Roque Galguera y Gonzalez
by
Attorney R. GALGUERA Y GONZALEZ.
FILTERING APPARATUS.
APPLICATION FILED APR. 12, 1918.
1,292,758.
Patented Jan. 28, 1919.
2 SHEETS—SHEET 2.
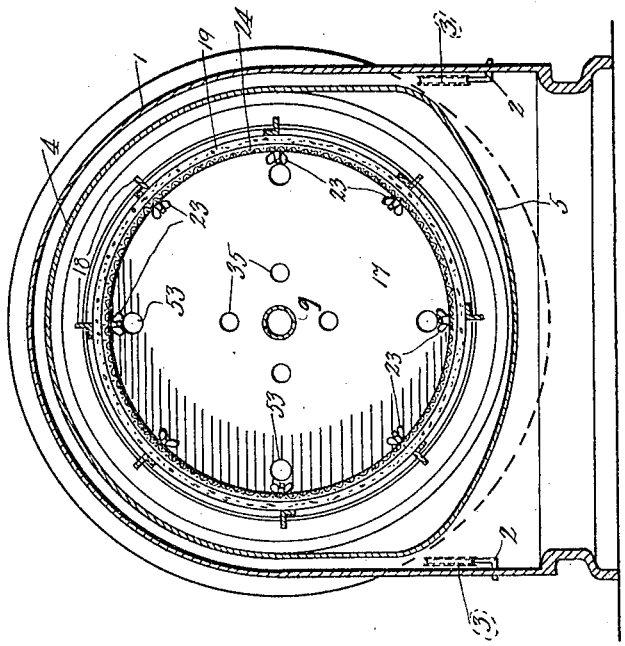
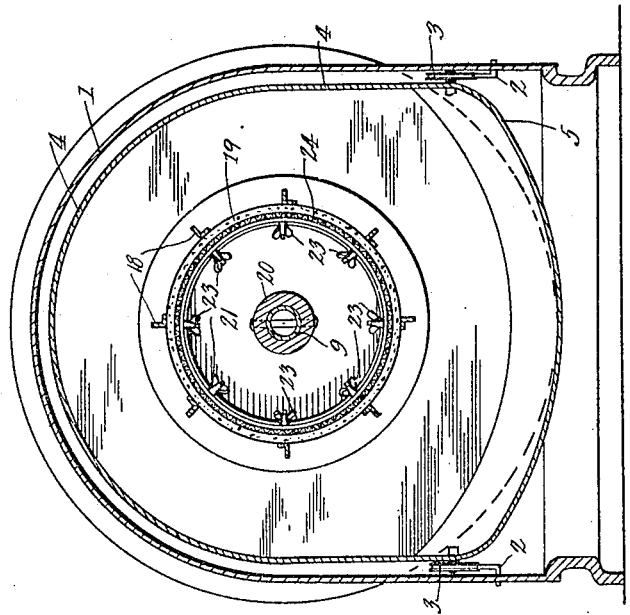
Inventor
Roque Galguera y Gonzalez.
by
Attorney

UNITED STATES PATENT OFFICE.

ROQUE GALGUERA Y GONZALEZ, OF HABANA, CUBA.

FILTERING APPARATUS.

1,292,758. Specification of Letters Patent. Patented Jan. 28, 1919.

Application filed April 12, 1918. Serial No. 228,144.

*To all whom it may concern:*

Be it known that I, ROQUE GALGUERA Y GONZALEZ, Habana, Cuba, have invented certain new and useful Improvements in Filtering Apparatus, of which the following is a specification.

This invention relates to improvements in filtering apparatus.

An object of the invention is to provide an apparatus in which a filtering body containing the mass to be treated is rotated at sufficiently high speed to force the liquid of the mass through the pores of the body, while the solid particles contained in the mass to be filtered are retained in the interior of the body.

Another object of the invention is to provide means in the interior of the rotary container for preventing the filtering mass from exerting under the influence of centrifugal force excessive pressure against the inner surface of the container, and for this purpose the container is equipped in its interior with a foraminous body through which the filtering mass has to pass before coming into contact with the porous material of the container.

Another object of the invention is to provide a rotary container in its interior with a flexible sieve or the like adapted to retain the solid particles which do not pass through the filtering container proper, and it is furthermore an object of the invention to discharge this solid residue from the interior of the container by changing the configuration of the internal sieve or by bringing said sieve to a partial collapse.

Another object of the invention is to provide an outer filtering body which may be partly displaced with respect to an inner foraminous body so as to facilitate the removal of solid residues from the inner body.

Another object of the invention is to combine a movable casing with the filtering device and an outer stationary casing inclosing the filtering device and the movable casing, whereby during the filtering operation the liquid passing through the filtering body is discharged into the inner casing and from there into a compartment of the outer casing, while after displacement of said filtering device with respect to the outer casing the residues remaining in the interior of the filtering element may be discharged into another compartment of the outer casing.

With these and other objects in view, an embodiment of the invention is illustrated in the accompanying drawing, wherein—

Figure 1 is a longitudinal central section through the entire device;

Fig. 2 is a sectional view on line 2—2 near one end of the filtering body;

Fig. 3 is a sectional view on line 3—3 through the filtering body, and

Fig. 4 is a detail top plan view of a bearing forming part of the device.

The device includes an outer stationary casing 1, made of sheet metal or the like, and having semi-cylindrical shape in its upper half, as seen in Fig. 3. The two side walls of this casing are provided on their inner surfaces with rails 2, adapted to support and serve as guiding means for rollers 3, which are attached to an inner movable casing 4. This inner casing 4 resembles, in its upper portion, the upper portion of the outer casing 1, but is provided with a forwardly inclined bottom wall 5, whereby a discharge spout near the bottom end of said inner casing 4 is formed. The front wall 6 of the inner casing 4 is provided with a preferably circular opening large enough to permit of the rotation of the front portion of the filtering body in said opening, and a similar opening is provided in the rear wall 7 of the inner casing 4.

The front and rear walls of the stationary casing 1 are each provided with a bearing 8, serving for the support of a hollow shaft 9, which is also supported outside said casing through bearings 10 on suitable standards 11. A pulley 12, mounted near the front end of the casing 1, may be driven from some suitable prime mover, not shown in the drawing, and serves for imparting rotation to the hollow shaft 9.

A casting, including a hub 13, a disk 14 reinforced by a plurality of radially extending arms 14', and a ring 15 connecting the outer ends of the arms 14', is mounted on the hollow shaft 9 so as to be rotatable with the same, and a similar but larger cast body, including a hub 16 and a disk 17 connected therewith, is also carried by the shaft 9, the two cast elements being firmly secured to each other and being held at suitable distances from each other by means of inclined rods 18, which connect castings near their outer ends. These castings, in combination with the plurality of rods 18, form a skeleton frame for the filtering body 19, which may consist of any desired porous material. The body 19 is secured in any desired way to the skeleton frame, and as shown consists of a truncated cone and may also be made of very finely meshed wire gauze or the like. The material of which this filtering body 19 is composed naturally will depend upon the nature and character of the liquids to be treated in the apparatus.

A casting, including a hub 20 secured to a disk or ring 21, is disposed in proximity to the hub 13, and is not only held against rotation with respect to the hollow shaft 9 but also against longitudinal displacement thereon. The disk 21 serves as support for a ring 22, which is secured to the circumference of said disk in any desired manner, as, for instance, by a plurality of thumb screws 23, and one edge of a flexible fabric 24, made of cloth or wire netting or the like, is also secured on the circumference of the disk 21 between said disk and the outer ring 22. This fabric is held equidistantly from the inner surface of the filtering body 19, as the opposite edge is similarly clamped between an outer ring 25 and an inner ring 26 fastened to the disk 17, which last named disk is secured to the hub 16 on the shaft 9. Owing to the provision of this fabric the mass to be filtered will be finely subdivided before coming into contact with the filtering body 19 and the pressure of the liquid against the filtering body 19 will be reduced.

The liquid is introduced through a supply conduit 30, which terminates in a nozzle 31, disposed within a box or casing 32 on a suitable standard 33, this nozzle entering the rear end of the hollow shaft 9, which projects from the bearing 10 into the casing 32. The casing 32 is closed on all sides, assuring thereby the introduction of the entire liquid supplied through the conduit 30 into the interior of the filter body 19. The liquid to be treated reaches the interior of the filter body either through openings 35 in the hollow shaft and which extend through the disk 17, or the liquid may be discharged into the interior of said body through a number of openings 36 in the shaft 9, disposed within the interior of the filtering body. A plate 37 in the interior of the hollow shaft 9 serves to prevent the liquid from flowing through the entire length of the shaft 9.

For the purpose of longitudinally displacing the filter body 19 on the shaft 9, a shaft 40 projects into the interior of the shaft 9, and a pin 41, extending transversely through the hub 13 of the casting, connects the inner end of said shaft 40 rigidly with said casting. This pin passes through a longitudinal slot 42 in the hollow shaft 9 thereby causing, upon longitudinal displacement of the shaft 40, also a longitudinal displacement of the hub on the shaft 9. As this hub 13 is rigidly connected through its skeleton frame with the disk 17 at the rear end of the filtering body, the entire body 19 with the frame will be shifted on said shaft. The outer end of the solid shaft 40 is supported by a thrust bearing, formed of a pointed screw 43, which enters a suitable recess in the end of the shaft 40, and which passes through a bearing member 44, slidable in transverse direction on guideways 46 on top of a standard 45, as shown in Fig. 4. To facilitate adjustment of the bearing screw 43, the latter is provided with a hand wheel 47, and the solid shaft 40 also carries a hand wheel or disk 48 near the bearing 10 at the front end of the casing 1, to facilitate displacement of the shaft.

A partition wall 50 divides the casing 1 into two compartments 51 and 52. In the operation of the device the filtering is effected and accelerated through the centrifugal force; the filtered liquid is discharged through the spout of the inner casing 4 into the compartment 51. If it is desired, however, to remove the solid residue from the interior of the cone, the rotary drive is interrupted, and the bearing 44 for the journal screw 43 is displaced transversely on the guideways 46. The shaft 40 can then be withdrawn longitudinally, thereby also causing displacement of the skeleton frame, the filter body 19, and the casing 4 on the shaft 9. The disk 21 does not take part in this longitudinal displacement, as it is rigidly mounted on the shaft, and the inner or flexible filter fabric is thereby folded or collapsed to assume approximately the position indicated in dotted lines in Fig. 1, as the distance between the two edges of the filter fabric is considerably reduced in comparison with the distance which the two edges occupied when the device was in operative position. This collapse of the filter fabric naturally will remove the residues adhering thereto, and this solid residue will then be thrown into the compartment 52, from which compartment it can be removed by opening the same or through suitable pipes which are not indicated in the drawing.

It will also be seen that the operation of this filter can be continued for a much longer period than the operation of ordinary filters, in which only a batch of the mass to be treated can be introduced, and in which the operation always has to be interrupted when this batch has been subject to treatment.

In order to facilitate the removal of the residue, the disk 17 at the rear end is provided with openings 53, which permit the withdrawal of these solid bodies from the rear end of the filtering cone. It is also obvious that masses of diffeernet consistencies and different temperatures can be continuously treated in this device. The device is preferably used for the filtering of the sap of cane sugar, but will readily lend itself also to the treatment of less or more viscous liquids.

I claim:

1. In a device of the character described, a rotary shaft, a filtering body firmly connected with said shaft, a foraminous body in said filtering body and rotatable therewith, and means for longitudinally displacing said filtering body independently of a portion of said foraminous body on the shaft.

2. In a device of the character described, the combination of a porous filtering body, a rotary shaft on which said body is mounted, disks closing the two ends of the body, and a foraminous element inserted into said body, a portion of said foraminous body being permanently secured to said porous body, other portions of said porous body and foraminous body being movable relatively to each other in longitudinal direction.

3. In a device of the character described, the combination of a porous filtering body, a rotary shaft on which said body is mounted, disks closing the two ends of the body, and a foraminous element inserted into said body, an edge portion of said foraminous element being firmly attached to an edge portion of said porous body, other portions of said porous body and foraminous body being movable relatively to each other in longitudinal direction but being held against relative circumferential movement.

4. In a device of the character described, the combination of a rotary shaft, a filtering body mounted thereon, disks closing the two ends of said body, a casing surrounding said filtering body, and means for longitudinally displacing said casing and said filtering body on said shaft.

5. In a device of the character described, a hollow rotary shaft, a filtering body mounted on said shaft so as to be rotatable therewith and slidable thereon, another shaft slidable in said rotary shaft, and means connecting the inner end of said slidable shaft with said filtering body.

6. In a device of the character described, the combination of a rotary shaft, a truncated cone-shaped filtering body, a disk firmly connected with the narrower end of said cone and said shaft, another disk firmly connected with the larger end of said cone, said disks and cone being displaceable in longitudinal direction on said shaft, a third disk adjacent said first named disk and held against displacement on said rotary shaft, a foraminous body secured to said third disk, means on said second disk supporting said foraminous body, and means for displacing said filtering body and a part of said foraminous body longitudinally with respect to the shaft.

7. In a device of the character described, the combination of a hollow rotary shaft, a truncated cone-shaped filtering body mounted on said shaft so as to be rotated therewith and displaceable thereon, a casing connected with said filtering body, an outer casing, means for supporting said first named casing on the outer casing, and means for displacing said truncated cone-shaped filtering body together with said casing longitudinally with respect to said shaft.

8. In a device of the character described, the combination of a hollow rotary shaft, a truncated cone-shaped filtering body mounted on said shaft so as to be rotatable therewith and longitudinally displaceable thereon, a foraminous flexible body supported in the interior of said filtering body, means for normally maintaining said foraminous body in the shape of a truncated cone, and means for deforming said foraminous body by varying the distance between the two ends of the foraminous body.

9. In a device of the character described, the combination of a rotary hollow shaft, means for supplying a liquid to be filtered to the interior of said shaft, a truncated cone-shaped filtering body mounted on said shaft so as to be rotatable therewith and longitudinally displaceable thereon, a disk supporting the rear end of said truncated cone-shaped body on the shaft, a foraminous body of flexible material mounted in the interior of said filtering body and supported by said disk, another disk for supporting the other end of said foraminous body, and means for deforming said foraminous interior body of flexible material by displacement of the supporting disk at one end with respect to the supporting disk at the other end, one of said disks being provided with openings for the discharge of the solid residues adherent to the foraminous body.

10. In a device of the character described, a rotary shaft, a truncated cone-shaped filtering body mounted on said shaft so as to be rotary therewith and longitudinally displaceable thereon, a casing having a spout and connected with said truncated cone-shaped filtering body, an outer casing, a partition dividing said outer casing into two compartments, and means for discharging the filtered fluid through said spout into one compartment and the residues into the other compartment.

11. In a device of the character described, the combination of a porous filtering body, a hollow rotary shaft, elements mounted on said shaft supporting said filtering body, another shaft slidably introduced into said first named hollow shaft and connected with one of the supports for said porous filtering body, and means movable in transverse direction with respect to said shafts for supporting the outer end of said inserted shaft.

In witness whereof I affix my signature.

ROQUE GALGUERA Y GONZALEZ.